United States Patent [19]

Robertson et al.

[11] 4,136,153

[45] Jan. 23, 1979

[54] SYSTEM FOR DIMINISHING THE EMISSION OF NOXIOUS GASES

[75] Inventors: Terrence M. Robertson; Larry G. Smith, both of Baton Rouge, La.

[73] Assignee: Stauffer Chemical Company, Westport, Conn.

[21] Appl. No.: 551,876

[22] Filed: Feb. 21, 1975

[51] Int. Cl.$^2$ .............................. C01B 17/00
[52] U.S. Cl. .................... 423/242; 423/522; 55/73
[58] Field of Search ............... 423/242–244, 423/522; 55/73

[56] References Cited

U.S. PATENT DOCUMENTS

| 1,390,410 | 9/1921 | Webster | 55/73 |
|---|---|---|---|
| 2,013,753 | 9/1935 | Hahr | 55/73 |
| 2,901,061 | 8/1959 | Hartig et al. | 55/73 |
| 2,906,372 | 9/1959 | Leonard et al. | 423/242 |
| 3,522,000 | 7/1970 | Kinney | 423/242 |

Primary Examiner—O. R. Vertiz
Assistant Examiner—Gregory A. Heller
Attorney, Agent, or Firm—Daniel C. Block

[57] ABSTRACT

This invention relates to the substantial reduction of emission of noxious gases into the atmosphere. More specifically, this invention relates to a system for saturating mist eliminators in conjunction with the sulfuric acid plant to remove $SO_3$ gas during an upset condition upstream of the mist eliminators. The system involves the spraying of sulfuric acid onto conventional mist eliminators to substantially saturate the same so that when contact is made with the mist eliminators by the $SO_3$ gas the same will be absorbed and be removed and will be prevented from being emitted to the atmosphere.

3 Claims, 4 Drawing Figures

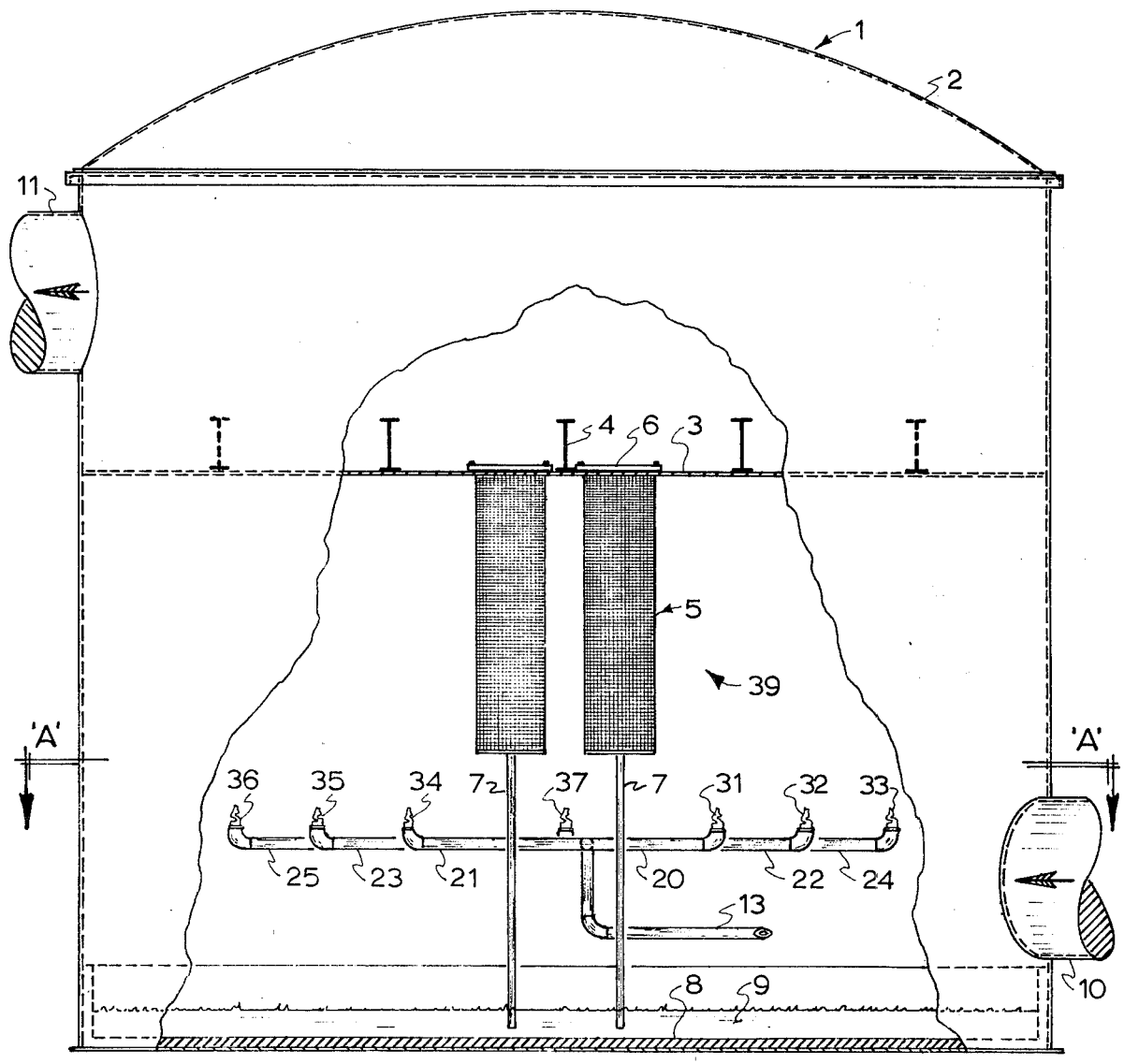
FIG. I

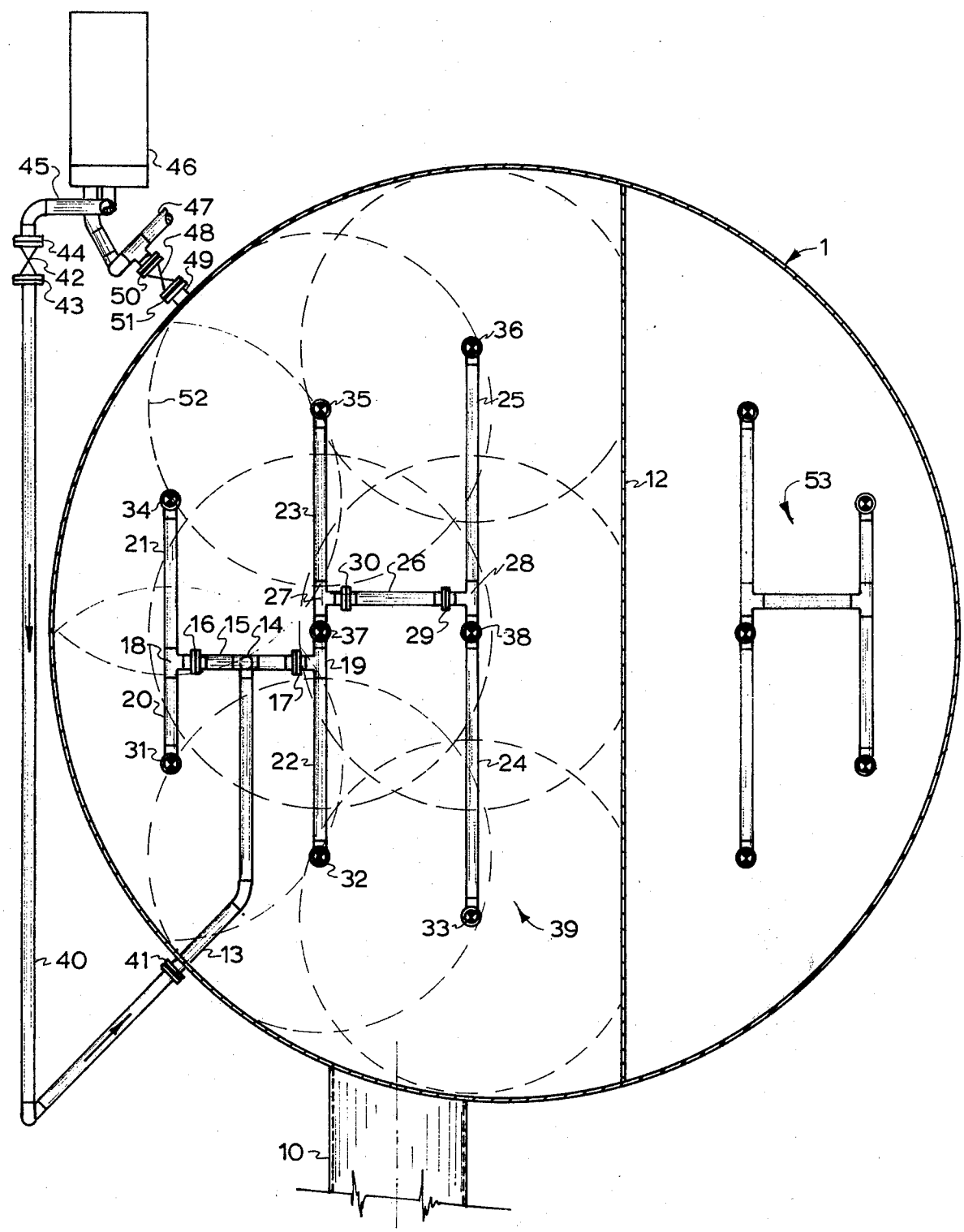
SECTION A-A
FIG. II

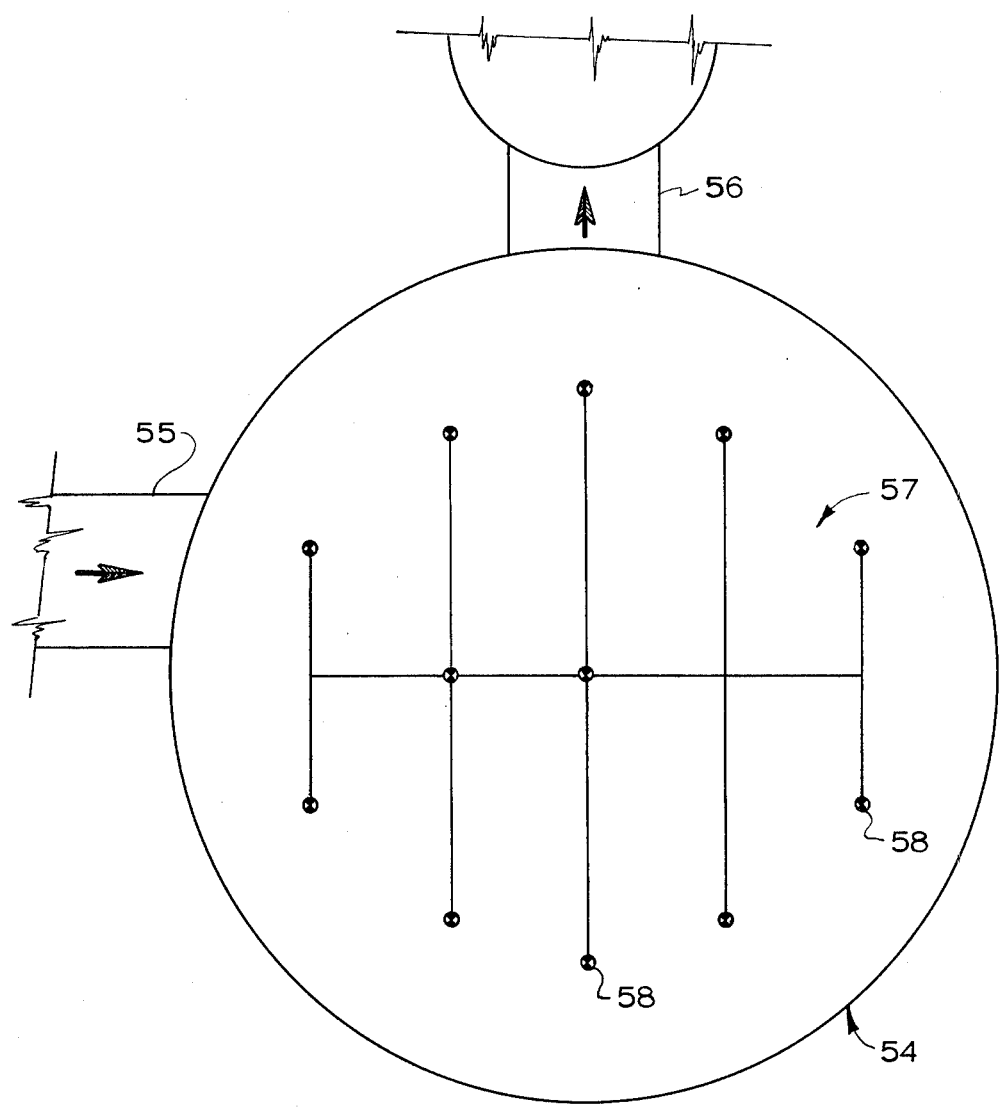
FIG. III
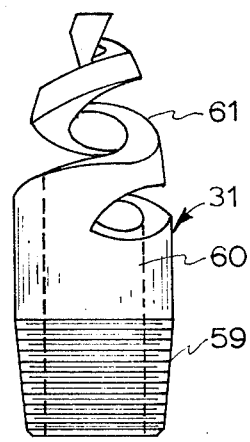
FIG. IV

SYSTEM FOR DIMINISHING THE EMISSION OF NOXIOUS GASES

BACKGROUND OF THE INVENTION

In the conventional manner for manufacturing sulfuric acid, sulphur is oxidized in the presence of heat and air and/or supplemental oxygen to form $SO_2$ which is then passed through a converter containing vanadium pentoxide catalyst to convert the same to $SO_3$. The gaseous $SO_3$ is then contacted with concentrated sulfuric acid to form additional sulfuric acid. The gaseous effluent from this operation contains $SO_2$, $SO_3$ and a mist commonly called sulfuric acid mist. This sulfuric mist is formed when $SO_3$ is contacted with moist air and forms small particles of sulfuric acid.

In order to remove these components from the effluent gaseous stream, the gases are contacted with a series of scrubbers and/or absorbers that essentially remove all the $SO_2$, $SO_3$ and sulfuric acid mist. Since these systems are not 100% efficient, from about one to twenty milligrams of sulfuric acid mist per cubic foot of effluent gas has heretofore been ejected into the stack and into the atmosphere. When this occurs, a rolling plume of the gaseous mist emits from the stack and is visible as a smoky cloud.

With the advent of more stringent government regulations for the removal of undesirable emissions and in an effort to improve community relations, it has become necessary to remove essentially all of the acid mist from being emitted. For this purpose a mist eliminator system has been devised. This system essentially consists of a large tank structure with a partition between the inlet and outlet wherein mist eliminator units are installed. The most commonly used mist eliminator consists of a vertical packed fiber bed retained between two screens. The elements may be a fiber bed packed between two concentric cylindrical screens or between two parallel flat screens. Chemically resistant fiberglass, synthetic fibers and other special type fibers are used for packing material, depending on the environment. Structural parts are made of any wrought weldable metal or glass reinforced resins. The exhaust gases containing the mist particles pass in a horizontal direction through the fiber bed. Clean gases emerge from the bed and rise upwardly to the exit from the system. The liquid particles are collected on the fibers in the bed and coalesce into liquid films which are moved horizontally through the fiber bed by the drag of the gases and then downward by gravity. The collected liquid drains off the downstream face of the fiber bed and out through the drain legs. If the elements are installed in a separate tank or vessel, the drain legs are immersed below a liquid level in the bottom of the tank to maintain a liquid seal. If the mist eliminator elements are suspended in the top of an absorbing tower, the drain legs are fitted with individual seal cups to maintain a liquid seal. One such mist eliminator system is sold under the trade name Brink ® mist eliminators by Monsanto Enviro-Chem Systems, Inc., of St. Louis, Missouri. For a more detailed explanation of the function of this type of mist eliminator, reference is made to a technical bulletin identified as IGI LRA 0472/10M/B08. While the design and construction of this type of mist eliminator forms no part of this invention, the subject matter of this technical bulletin is incorporated herein by reference for completeness of the description of the subject matter of this invention.

Under normal sevice conditions, the above described mist eliminators remove 99.5% or more of all sulfuric acid mist from the gaseous stream prior to emission from the exhaust stacks. However, when an upset conditon upstream of the eliminator unit exists and a large volume of $SO_3$ gas is injected into mist eliminator unit, it has been found in practice that these mist eliminators will not function to remove the $SO_3$ gas. The upset condition can occur when the plant is in a start-up condition or more commonly when an absorber or a scrubber upsteam in the mist eliminator unit malfunctions due to mechanical difficulties. Under these circumstances, large volumes of $SO_3$ gas is injected into the mist eliminators. When these large volumes of $SO_3$ gas are injected into the mist eliminator unit, they quickly saturate the units with the $SO_3$ gas which forms oleum and a breakthrough occurs and substantial amounts, by volume, of the $SO_3$ gas is then emitted through the stacks into the atmosphere. Thus a large rolling plume of smoke appears in the atmosphere which is clearly visible and undesirable.

In order to rectify this situation, a plant shut-down is required to not only repair the malfunction but also to remove all the $SO_3$ gas from the mist eliminator units. This latter operation requires that the mist eliminator unit within the tank be flooded with sulfuric acid. This amounts to filling the tank with sulfuric acid to absorb the $SO_3$ gas from the eliminator units and then draining the same. This operation requires from six to twenty-four hours to carry out.

BRIEF DESCRIPTION OF THE INVENTION

It has been discovered that the time necessary of from six to twenty-four hours to put the mist eliminator units back into operation can be reduced to a matter of minutes. This is brought about by installing a spray system which saturates the mist eliminator units in such a way that the mist eliminator units are immediately converted to an acid absorber unit wherein all the $SO_3$ gas contacting the same will of necessity be contacted with fresh sulfuric acid which is immediately absorbed and condensed. This is brought about by installing a spray system within the mist eliminators units in such a way all the mist eliminators will be subjected to an acid spray.

BRIEF DESCRIPTION OF THE DRAWINGS

FIG. I is a side elevation of a mist eliminator unit with portions broken away to show internal details.

FIG. II is a cross-sectional view taken on line A—A of FIG. I.

FIG. III is a schematic plan view of a modified eliminator unit.

FIG. IV is a side elevation of a nozzle unit useable with this invention.

DETAILED DESCRIPTION OF THE INVENTION

Referring to FIG. I, a tank (1) is provided having a cover (2). Intermediate, the top and bottom of tank (1) is a horizontal partition member (3). The partition member (3) is supported by I-beam members (4). Suspended from partition (3) are conventional mist eliminator units generally designated at (5) and supported by a plate (6) connected to partition (3). The lower end of the mist eliminator units (5) are provided with conduits (7) extending downward into a pool of sulfuric acid (9). The lower portion of the tank (1) is lined with brick indicated at (8). Exhaust gases from the sulfuric acid plant enter the tank (1) via conduit (10) contained in the lower portion thereof and leave the tank (1) via conduit (11) above partition (3). As noted above, the amount of sulfuric acid mist in the gaseous stream entering tank (1) via conduit (10) is about one to twenty milligrams per foot of effluent gas. After the gaseous stream passes through mist eliminator units (5), the amount of sulfuric acid mist is reduced to about 0.005 to 0.1 milligrams per foot of effluent gas which is well within the desirable limits. The effluent gases are removed from tank (1) via conduit (11) and conveyed to the exhaust stacks or other processing units as desired.

As illustrated in FIG. I, only two mist eliminator units (5) are illustrated. It is to be understood however that a plurality of mist eliminator (5) suspended from partition (3) are usually employed. The exact number of mist eliminator units (5) employed in any particular plant will depend on the volume of stack gases to be treated and the pressure differential that is desired between the bottom portion of partition (3) and the top portion of partition (3).

Referring now to FIG. II, tank (1) is provided with a vertical partition (12) wherein the large mist eliminator portion to the left of partition (12) is provided that is designed for high capacity units with the portion to the right of partition (12) designed for a smaller mist eliminator unit. Each side of the vertical partition (12) is provided with an acid distribution system generally indicated at (39) and (53). Since the acid distribution system indicated at (53) functions in the identical manner as acid distribution system (39), the internal acid distribution system indicated at (39) will be described.

The acid distribution system (39) consists of a conduit (13) extending through the wall of tank (1) and connected to a source of acid via conduit (40) and coupling (41). The external portion of the system will be described hereinafter. The conduit (13) is connected to a T-member (14) to a conduit (15). One end of conduit (15) is coupled at (16) to a T-connection (18) which in turn is connected to conduits each and (21) on each end thereof. On the outer extremities of conduits (20) and (21) are connected upwardly extending nozzles indicated at (31) and (34). The conduit (15) is also connected via coupling (17) to a T-member (19) which is in turn connected on each end thereof to a conduit (22) and (23). The outer portion of conduit (22) contains an upwardly extending nozzle (32). The conduit (23) is connected to a T-member (27) which is in turn connected to an upwardly extending nozzle (37) which in turn is connected to T-member (19). The outer end of conduit (23) is provided with an upwardly extending nozzle unit (35). Connected to the T-member (27) via coupling (30) is a conduit (26). Conduit (26) is connected to a T-member (28) via coupling (29). One end of the T-member (28) has connected thereto a conduit (25) which has an upwardly extending nozzle (36) connected to the outer end thereof. T-member (28) has also connected thereto an upwardly extending nozzle (38) which in turn is connected to a conduit (24) having an upwardly extending nozzle (33) connected on the outer end thereof.

The acid distribution system (39) is connected to a source of sulfuric acid which consists of a conduit (40) connected to conduit (13) via coupling (41). The other end of conduit (40) is connected to a valve (42) via coupling (43) which in turn is connected to a conduit (45) via coupling (44). The conduit (45) is connected to a pump (46). The pump (46) is connected to an inlet conduit (47) which is connected to a source of sulfuric acid, not shown. Also connected to conduit (47) is a conduit (49) which communicates through the wall of tank (1) to the pool (9) of sulfuric acid in the bottom thereof. Intermediate conduit (49) and (47) is a valve (48) coupled thereto by couplings (50) and (51).

Referring to FIG. III, a modified form of the invention is illustrated. Specifically, a tank (54) is illustrated having an acid distribution system (57) mounted therein. The tank (54) contains a partition similarly as illustrated at (3) in FIG. I except tank (54) is not provided with a vertical partition to provide two units. Thus, tank (54) is provided with an inlet conduit (55) wherein exhaust gases are injected thereto with an outlet (56) above the partition, not shown. The distribution system (57) is provided with a plurality of couplings, conduit and nozzles (58) which function in a similar manner as described in regard to the invention as set forth in FIGS. I and II. The system as illustrated in FIG. III is designed to remove sulfuric acid mist from a single sulfuric train as opposed to two trains as illustrated in FIGS. I and II.

Referring to FIG. IV, the nozzle (31) is illustrated. The nozzle (31) is provided with an internal conduit (60) which is inner-connected with threads (59) to conduit (20). Since all the nozzles used in the present invention are identical the description of nozzle (31) is provided. The opening or conduit (60) communicates with a helix portion (61) which functions to distribute acid being pumped therethrough in a circular pattern. The nozzle (31) is formed of an inert material which is corrosion resistant to sulfuric acid. The nozzle (31) is commercially available and is specifically designed to form a circular pattern of liquids passing therethrough and is formed of a corrosion resistant material.

In operation of the present invention, it will be assumed that exhaust gases from a sulfuric acid plant are conveyed through various unit operations such as absorbers and/or scrubbers and which gases are injected into tank (1) at (10) with the sulfuric acid mist being removed by mist eliminators (5) and passed out of tank (1) via conduit (11) into the stack and/or other unit operation. When an upset condition occurs upstream of the tank (1), such as when an absorber or scrubber mechanically malfunctions, $SO_3$ gas will be injected into tank (1) via conduit (10). When this occurs, pump (46) is activated and valve (42) is opened. Sulfuric acid is pumped through conduit (40) into the acid distribution system (39). When acid is pumped to system (39) under pressure, the acid is ejected into the tank (1) via upwardly extending spray nozzles (31), (34), (32), (35), (33), (36), (37) and (38) in a circular pattern as indicated at (52) in FIG. II. Thus, the outer portion of the mist eliminator units (5) become essentially saturated with sulfuric acid. When the $SO_3$ gas contacts the eliminator units (5), it will become absorbed within the sulfuric acid on the mist eliminators (5). In this manner, the mist eliminators (5) are essentially converted into an absorbing unit for the $SO_3$. In this manner, essentially all of the $SO_3$ gas is removed until such time as the upset condition can be corrected and the unit is placed back under normal operating conditions. During the operation of the system of this invention, it often becomes necessary to removed sulfuric acid from the bottom portion of tank (1) to maintain the pool (9) at a predetermined level. For this purpose, the conduit (49) communicates with the lower portion thereof and valve (48) is opened so that the source of the sulfuric acid can also communicate with the pool (9) at the bottom portion of tank (1).

EXAMPLE

A system as illustrated in FIGS. I and II was installed in tank (1) and tested for the removal of $SO_3$ gas. For this test an absorbing tower malfunctioned so as to overload the normal operation of the mist eliminator unit. The mist eliminator unit quickly became saturated with $SO_3$ gas and a visible plume of smoke emitted from the stack. The acid distribution system (39) was immediately activated and within seven minutes the stack completely cleared up with no visible plume emitting therefrom. When the absorbing tower was put back into operation and the acid distribution system (39) was deactivated, the stack gases remained clear with no visible plume. Moreover, it was not necessary to shut the plant down and flood the units as was heretofore practiced.

As can be seen from the above, the system of the present invention substantially reduces down time encountered when upset conditions occur during the manufacturing of sulfuric acid. Such down times are costly in the loss of production in addition to substantial delays to clear up the $SO_3$ gas within the mist eliminator unit.

What is claimed is:
1. In a process for removing $SO_3$ gas from exhaust gases from a sulfuric acid plant wherein said exhaust gases from said plant are treated in either absorbers or scrubbers or both and then conveyed to a mist eliminator system to remove sulfuric acid mist by injecting said exhaust gases into a tank, passing the exhaust gases through mist eliminator units and then conveying the exhaust gases out of the tank, the improvement comprising, when the mist eliminator system is in an overload condition, spraying liquid sulfuric acid onto the outer surface of the mist eliminator units to saturate the same so that the $SO_3$ gas will be absorbed when coming in contact with said mist eliminator units.

2. The process as set forth in claim 1 wherein the liquid sulfuric acid that is sprayed onto the outer surface of said mist eliminator units is pumped under sufficient pressure to a plurality of nozzle members within said tank, said nozzle members extending in an upwardly direction.

3. The process as set forth in claim 2 wherein said nozzle members are helical in configuration so that the liquid sulfuric acid emitted therefrom forms a circular pattern.

* * * * *

UNITED STATES PATENT AND TRADEMARK OFFICE
CERTIFICATE OF CORRECTION

PATENT NO. : 4,136,153
DATED : January 23, 1979
INVENTOR(S) : Terrence M. Robertson and Larry G. Smith It is certified that error appears in the above-identified patent and that said Letters Patent are hereby corrected as shown below:

Column 2, line 26, the word reading "unit" should read ---units---.

Column 2, line 43, the word reading "eliminators" should read ---eliminator---.

Column 3, line 40, the word reading "each" immediately following the word "conduits" should read "(20)".

Signed and Sealed this

Twenty-fourth Day of June 1980

[SEAL]

Attest:

SIDNEY A. DIAMOND

Attesting Officer     Commissioner of Patents and Trademarks